(12) United States Patent
Takeda

(10) Patent No.: US 9,238,480 B2
(45) Date of Patent: Jan. 19, 2016

(54) STEERING CONTROL DEVICE

(71) Applicant: NISSAN MOTOR CO., LTD., Yokohama-shi, Kanagawa (JP)

(72) Inventor: Yuya Takeda, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/430,745

(22) PCT Filed: Sep. 11, 2013

(86) PCT No.: PCT/JP2013/074558
§ 371 (c)(1),
(2) Date: Mar. 24, 2015

(87) PCT Pub. No.: WO2014/050566
PCT Pub. Date: Apr. 3, 2014

(65) Prior Publication Data
US 2015/0246686 A1    Sep. 3, 2015

(30) Foreign Application Priority Data

Sep. 26, 2012  (JP) ................................ 2012-212176
Sep. 26, 2012  (JP) ................................ 2012-212178

(51) Int. Cl.
*B62D 6/00*  (2006.01)
*B62D 15/02*  (2006.01)
*G06K 9/00*  (2006.01)

(52) U.S. Cl.
CPC .............. *B62D 6/008* (2013.01); *B62D 15/025* (2013.01); *G06K 9/00798* (2013.01)

(58) Field of Classification Search
USPC .......................................................... 701/41
See application file for complete search history.

(56) References Cited

U.S. PATENT DOCUMENTS

| | | | | |
|---|---|---|---|---|
| 6,265,991 | B1 * | 7/2001 | Nishiwaki ............... | G01S 7/295 340/435 |
| 2006/0011404 | A1 * | 1/2006 | Goto ...................... | B62D 6/002 180/402 |
| 2009/0265062 | A1 * | 10/2009 | Nguyen ............... | B62D 15/025 701/42 |
| 2010/0250064 | A1 * | 9/2010 | Ota ...................... | B60W 40/076 701/36 |
| 2011/0227781 | A1 * | 9/2011 | Nitanda ................ | B60W 40/06 342/70 |
| 2014/0012469 | A1 * | 1/2014 | Kunihiro ............ | B60W 40/072 701/41 |

FOREIGN PATENT DOCUMENTS

JP            11-78938 A        3/1999

* cited by examiner

*Primary Examiner* — Thomas Tarcza
*Assistant Examiner* — Alex C Dunn
(74) *Attorney, Agent, or Firm* — Young Basile

(57) ABSTRACT

The turning amount of a turning unit is controlled based on the steering amount of a steering unit mechanically uncoupled from the turning unit, and the change amount of the steering reaction force relative to the change amount of the self-aligning torque in a steering reaction force characteristic is increased as a curvature of a white line is increased when the steering reaction force corresponding to the self-aligning torque is applied to the steering unit based on the steering reaction force characteristic corresponding to the self-aligning torque such that the larger the self-aligning torque, the larger the steering reaction force.

7 Claims, 11 Drawing Sheets

STEERING CONTROL DEVICE

CROSS REFERENCE TO RELATED APPLICATIONS

The present application claims priority to Japanese Patent Application Nos. 2012-212176, filed Sep. 26, 2012, and 2012-212178, filed Sep. 26, 2012, each incorporated herein in its entirety.

TECHNICAL FIELD

The present invention relates to a steering control device.

BACKGROUND

Japanese Patent Application Publication No. H11-78938 discloses a technology of applying a steering reaction force to a steering wheel according to a self-aligning torque in turning in such a manner that the larger the curvature of the turning, the smaller the steering reaction force for the purpose of achieving smooth passing through a curve. However, in this conventional technology, as the curvature becomes larger, the steering angle changes more largely with a change in a maintained steering torque. Hence, a vehicle is highly sensitive to a steering torque, which leads to a problem of making it difficult for a driver to perform course correction.

SUMMARY

It is an object of the present invention to provide a steering control device capable of facilitating the course correction by the driver during turning.

In the present invention, a turning amount of a turning unit is controlled based on a steering amount of a steering unit mechanically uncoupled from the turning unit, and a change amount of a steering reaction force relative to a change amount of a self-aligning torque in a steering reaction force characteristic is increased as a curvature of a white line is increased when applying the steering reaction force corresponding to the self-aligning torque to the steering unit based on the steering reaction force characteristic corresponding to the self-aligning torque such that the larger the self-aligning torque, the larger the steering reaction force.

Therefore, since the larger the curvature, the smaller the change in the steering angle relative to the change in the maintained steering torque, the sensitivity of the vehicle to the steering torque is kept low, and thus the course correction by the driver during turning can be facilitated.

DESCRIPTION OF EMBODIMENTS

Example 1

System Configuration

Figure 1:
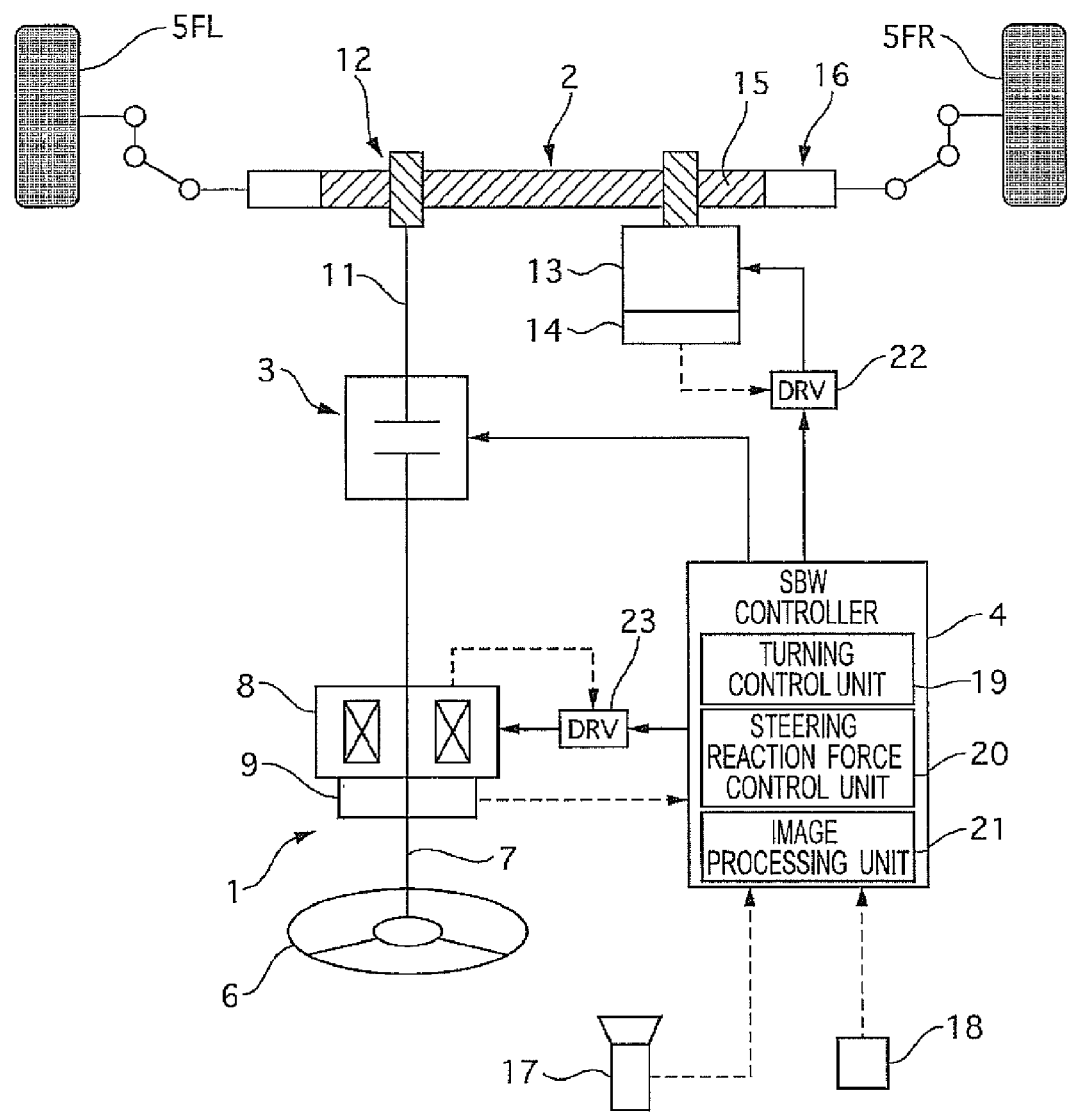
FIG. 1 is a system diagram showing a steering system of a vehicle according to Example 1.

FIG. 1 is a system diagram showing a steering system of a vehicle according to Example 1. A steering device according to Example 1 mainly includes a steering unit 1, a turning unit 2, a backup clutch 3 and an SBW controller 4. The steering device adopts a steer-by-wire (SBW) system in which the steering unit 1 configured to receive a steering input from a driver is mechanically uncoupled from the turning unit 2 configured to turn left and right front wheels (turning wheels) 5FL and 5FR.

The steering unit 1 includes a steering wheel 6, a column shaft 7, a reaction force motor 8 and a steering angle sensor 9.

The column shaft 7 rotates integrally with the steering wheel 6. The reaction force motor 8 is a brushless motor, for example, and is a coaxial motor whose output shaft is coaxial with the column shaft 7. The reaction force motor 8 outputs a steering reaction force torque to the column shaft 7 in response to a command from the SBW controller 4. The steering angle sensor 9 detects an absolute rotation angle of the column shaft 7, i.e., a steering angle of the steering wheel 6.

The turning unit 2 includes a pinion shaft 11, a steering gear 12, a turning motor 13 and a turning angle sensor 14. The steering gear 12 is a rack and pinion type steering gear, and turns the front wheels 5L and 5R according to rotation of the pinion shaft 11. The turning motor 13 is a brushless motor, for example, and has an output shaft coupled to a rack gear 15 through an unillustrated reducer. The turning motor 13 outputs a turning torque to turn the front wheels 5 to a rack 16 in response to a command from the SBW controller 4.

The turning angle sensor 14 detects an absolute rotation angle of the turning motor 13. Here, the rotation angle of the turning motor 13 and the turning angle of the front wheels 5 always have a uniquely defined correlation with each other. Thus, the turning angle of the front wheels 5 can be detected from the rotation angle of the turning motor 13. Hereinafter, unless otherwise described, it is assumed that the turning angle of the front wheels 5 is calculated from the rotation angle of the turning motor 13.

The backup clutch 3 is provided between the column shaft 7 in the steering unit 1 and the pinion shaft 11 in the turning unit 2. The backup clutch 3 mechanically uncouples the steering unit 1 from the turning unit 2 when released, and mechanically couple the steering unit 1 to the turning unit 2 when engaged.

In addition to the steering angle sensor 9 and the turning angle sensor 14, an image of a driving road in front of an own vehicle, which is shot by a camera 17, and a vehicle speed (vehicle body speed) detected by a vehicle speed sensor 18 are inputted to the SBW controller 4. The SBW controller 4 includes: a turning control unit 19 configured to control the turning angle of the front wheels 5FL and 5FR; a steering reaction force control unit 20 configured to control the steering reaction force torque to be applied to the column shaft 7; and an image processing unit 21.

The turning control unit 19 generates a command turning angle based on certain kinds of input information, and outputs the generated command turning angle to a current driver 22. The current driver 22 controls a command current to the turning motor 13 by angle feedback to cause an actual turning angle detected by the turning angle sensor 14 to coincide with the command turning angle. The steering reaction force control unit 20 generates a command steering reaction force torque based on certain kinds of input information, and outputs the generated command steering reaction force torque to a current driver 23.

The current driver 23 controls a command current to the reaction force motor 8 by torque feedback to cause an actual steering reaction force torque estimated from a current value of the reaction force motor 8 to coincide with the command steering reaction force torque. The image processing unit 21 recognizes white lines (driving lane marking) on the left and right of a driving lane by performing image processing, such as edge extraction, on the image of the driving road in front of the own vehicle shot by the camera 17. In addition, in case of a failure of the SBW system, the SBW controller 4 mechanically couples the steering unit 1 to the turning unit 2 by engaging the backup clutch 3, thereby enabling the rack 16 to be moved in an axial direction by steering of the steering wheel 6. In this event, control may be performed, which is equivalent to an electric power steering system to assist steering force of a driver with an assist torque of the turning motor 13. The above SBW system may be configured as a redundant system including multiple sensors, controllers and motors. Moreover, the turning control unit 19 and the steering reaction force control unit 20 may be provided separately.

In Example 1, stability control and correction steering reduction control are carried out in the aim of reducing a correction steering amount of the driver and reducing steering load. In the stability control, two feedback (F/B) controls are performed for the purpose of improving the vehicle stability against disturbances (crosswind, road surface unevenness, wheel tracks, road surface cant, and the like).

1. Yaw Angle F/B Control

Correcting the turning angle according to a yaw angle, which is an angle formed by the white line and the traveling direction of the own vehicle, to reduce the yaw angle generated by the disturbance.

2. Lateral Position F/B Control

Correcting the turning angle according to a distance (lateral position) to the white line to reduce a lateral position change that is an integral value of the yaw angle generated by the disturbance.

In the correction steering reduction control, three reaction force offset controls are performed for the purpose of improving the vehicle stability for the steering input by the driver.

1. Reaction Force Offset Control According to Lateral Position

Offsetting steering reaction force characteristics corresponding to a self-aligning torque according to the lateral position in a direction in which the absolute value of the steering reaction force is increased to suppress inversion of the sign of the steering torque when the driver performs correction steering over a steering angle neutral position.

2. Reaction Force Offset Control According to Deviation Margin Time

Offsetting steering reaction force characteristics corresponding to a self-aligning torque according to deviation margin time (time to reach the white line) in a direction in which the absolute value of the steering reaction force is increased to suppress inversion of the sign of the steering torque when the driver performs correction steering over a steering angle neutral position.

3. Reaction Force Offset Control According to Curvature

Offsetting steering reaction force characteristics corresponding to a self-aligning torque according to the curvature of the white line in the same sign direction as the self-aligning torque to reduce maintained steering force of the driver during turning and suppress a maintained angle change relative to a maintained steering force change.

[Turning Control Unit]

Figure 2:
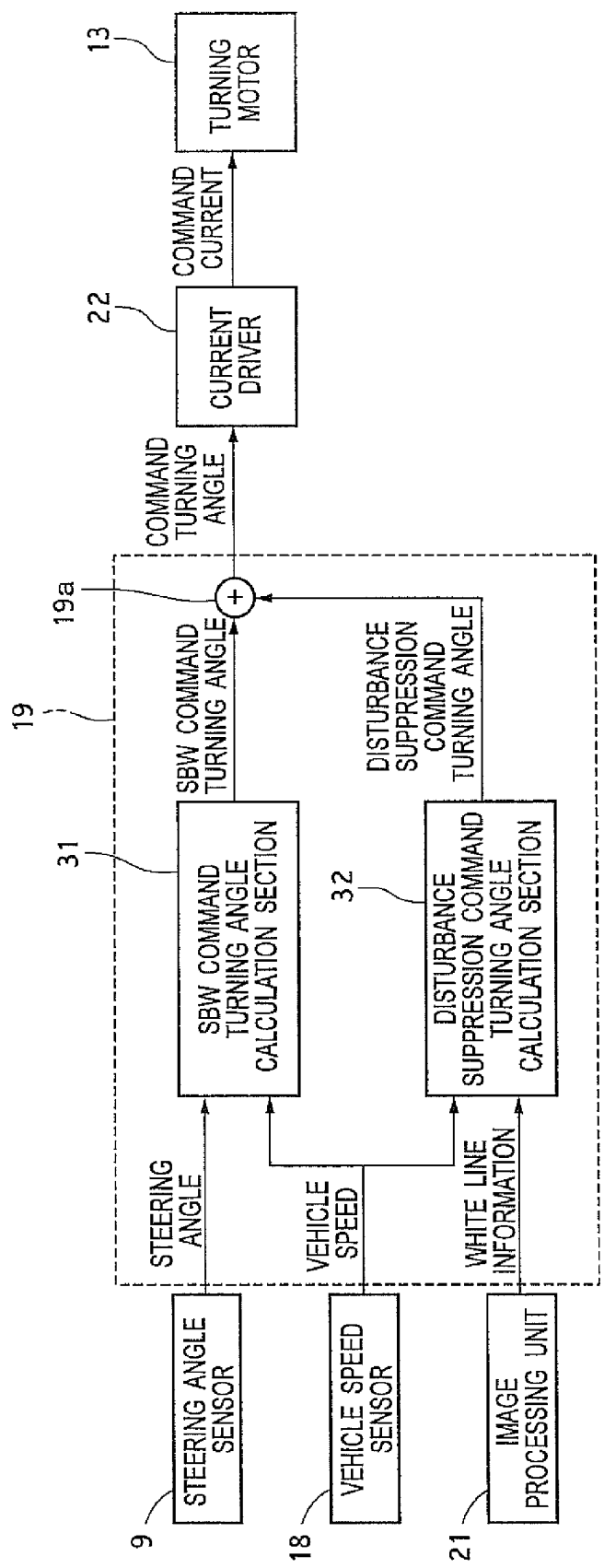
FIG. 2 is a control block diagram of a turning control unit 19.

FIG. 2 is a control block diagram of the turning control unit 19. An SBW command turning angle calculation section 31 calculates a SBW command turning angle based on the steering angle and the vehicle speed. A disturbance suppression command turning angle calculation section 32 calculates a disturbance suppression command turning angle to correct the SBW command turning angle in the stability control based on the vehicle speed and the white line information. The disturbance suppression command turning angle calculation section 32 is described in detail later. An adder 19a outputs a value obtained by adding up the SBW command turning angle and the disturbance suppression command turning angle to the current driver 22 as a final command turning angle.

[Steering Reaction Force Control Unit]

Figure 3:
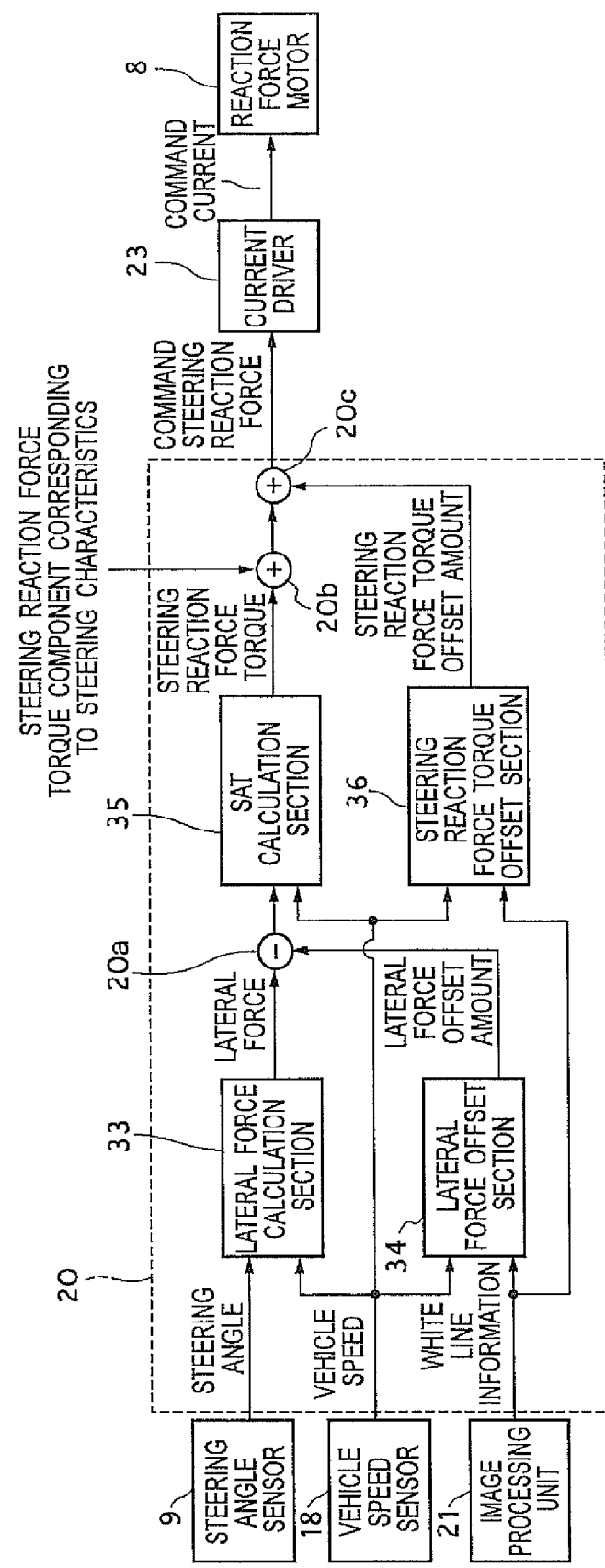
FIG. 3 is a control block diagram of a steering reaction force control unit 20.

FIG. 3 is a control block diagram of the steering reaction force control unit 20. A lateral force calculation section 33 calculates a tire lateral force, based on the steering angle and the vehicle speed, by referring to a steering angle-lateral force conversion map showing a relationship between the steering angle and the tire lateral force for each vehicle speed in a conventional steering device, which is obtained beforehand by experiment or the like. The steering angle-lateral force conversion map has the following characteristics. Specifically, the larger the steering angle, the larger the tire lateral force. Also, the smaller the steering angle, the larger the change amount of the tire lateral force relative to the change amount of the steering angle compared with the case of a larger steering angle. Moreover, the higher the vehicle speed, the smaller the tire lateral force.

A lateral force offset section 34 calculates a lateral force offset amount, based on the vehicle speed and the white line information, to offset the steering reaction force characteristics in the reaction force offset control according to the curvature. The lateral force offset section 34 is described in detail later. A subtractor 20a subtracts the lateral force offset amount from the tire lateral force.

A SAT calculation section 35 calculates a steering reaction force torque generated by the tire lateral force, based on the vehicle speed and the tire lateral force after offset by the lateral force offset amount, by referring to a lateral force-steering reaction force torque conversion map showing a relationship between the tire lateral force and the steering reaction force torque in a conventional steering device, which is obtained beforehand by experiment or the like. The tire lateral force-steering reaction force torque conversion map has the following characteristics. Specifically, the larger the tire lateral force, the larger the steering reaction force torque. Also, the smaller the tire lateral force, the larger the change amount of the steering reaction force torque relative to the change amount of the tire lateral force compared with the case of a larger tire lateral force. Moreover, the higher the vehicle speed, the smaller the steering reaction force torque. These characteristics are obtained by simulating the reaction force generated in the steering wheel by the self-aligning torque that returns the wheels to their straight-driving state, which is generated by a road surface reaction force, in a conventional steering device.

An adder 20b adds up the steering reaction force torque and steering reaction force torque components (spring term, viscosity term and inertia term) corresponding to the steering characteristics. The spring term is a component proportional to the steering angle, and is calculated by multiplying the steering angle by a predetermined gain. The viscosity term is a component proportional to the steering angle speed, and is calculated by multiplying the steering angle speed by a predetermined gain. The inertia term is a component proportional to the steering angle acceleration, and is calculated by multiplying the steering angle acceleration by a predetermined gain.

A steering reaction force torque offset section 36 calculates a steering reaction force torque offset amount to offset the steering reaction force characteristics in the reaction force offset control according to the lateral position or the deviation margin time, based on the vehicle speed and the image of the driving road in front of the own vehicle. The steering reaction force torque offset section 36 is described in detail later. An adder 20c outputs a value obtained by adding up the steering torque offset amount and the steering reaction force torque added with the steering reaction force torque components corresponding to the steering characteristics to the current driver 23 as a final command steering reaction force torque.

[Disturbance Suppression Command Turning Angle Calculation Section]

Figure 4:
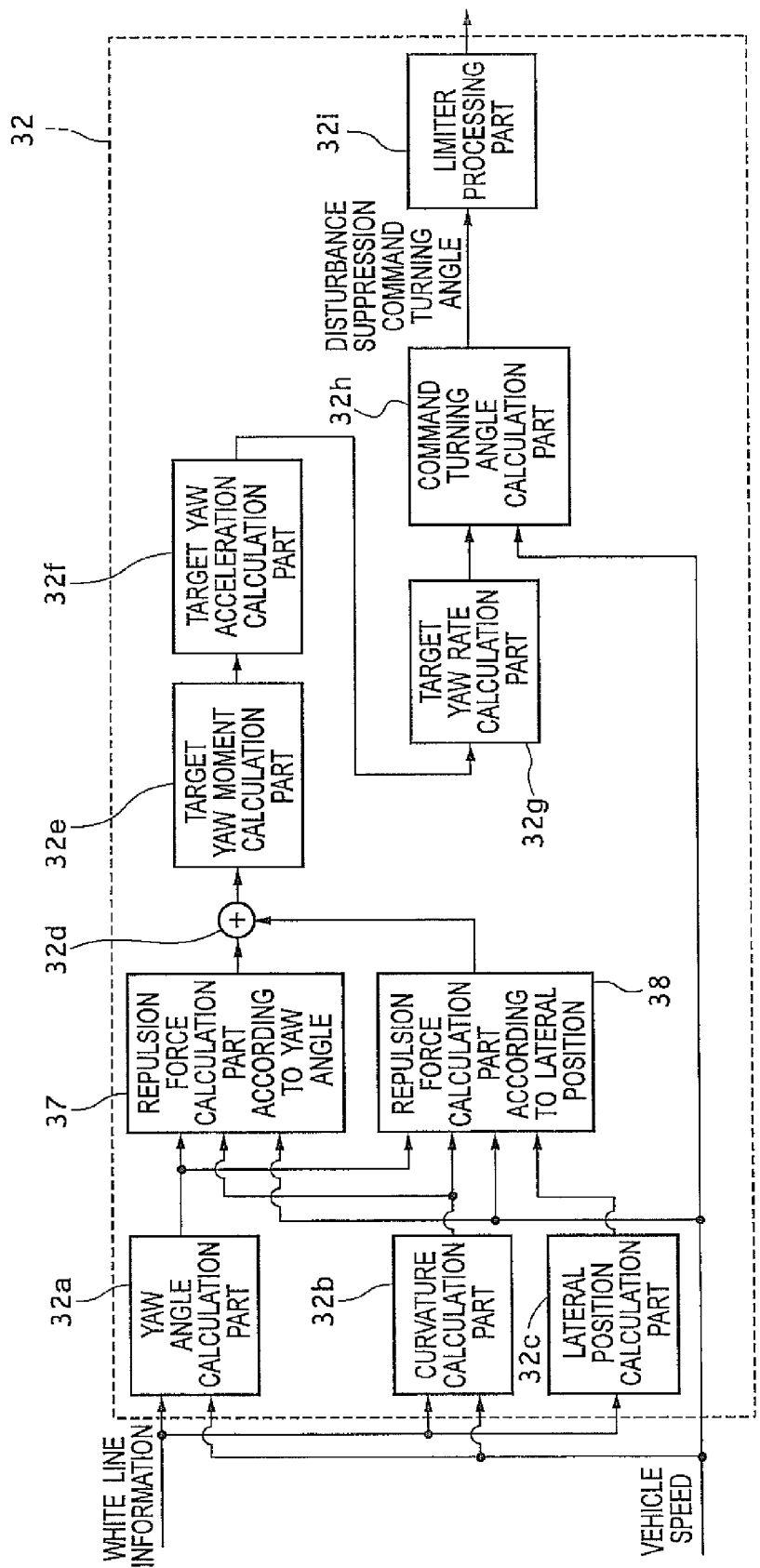
FIG. 4 is a control block diagram of a disturbance suppression command turning angle calculation section 32.

FIG. 4 is a control block diagram of the disturbance suppression command turning angle calculation section 32. A yaw angle calculation part 32a calculates a yaw angle that is an angle formed by the white line at a front gaze point and the traveling direction of the own vehicle. It is assumed that the yaw angle at the front gaze point is an angle formed by the white line and the vehicle traveling direction after a predetermined time period (e.g., 0.5 seconds). The yaw angle can be easily and accurately detected by calculating the yaw angle based on the image of the driving road shot by the camera 17.

A curvature calculation part 32b calculates the curvature of the white line at the front gaze point. A lateral position calculation part 32c calculates a distance to the white line at the front gaze point. A repulsion force calculation part 37 according to the yaw angle calculates a repulsion force of the vehicle to reduce the yaw angle generated by the disturbance in the yaw angle F/B control, based on the yaw angle, the curvature and the vehicle speed. The repulsion force calculation part 37 according to the yaw angle is described in detail later.

A repulsion force calculation part 38 according to the lateral position calculates a repulsion force of the vehicle to reduce the lateral position change generated by the disturbance in the lateral position F/B control, based on the yaw angle, the curvature, the vehicle speed and the distance to the white line at the front gaze point. The repulsion force calculation part 38 according to the lateral position is described in detail later. An adder 32d calculates a lateral-direction repulsion force by adding up the repulsion force corresponding to the yaw angle and the repulsion force corresponding to the lateral position.

A target yaw moment calculation part 32e calculates a target yaw moment based on the lateral-direction repulsion force, a wheel base (inter-axle distance), a rear-wheel axle load, and a front-wheel axle load. To be more specific, a value obtained by multiplying the lateral-direction repulsion force by a ratio of the rear-wheel axle load to the vehicle weight (front-wheel axle load+rear-wheel axle load) and the wheel base is used as the target yaw moment. A target yaw acceleration calculation part 32f calculates a target yaw acceleration by multiplying the target yaw moment by a yaw inertia moment coefficient. A target yaw rate calculation part 32g calculates a target yaw rate by multiplying the target yaw acceleration by a headway.

A command turning angle calculation part 32h calculates a disturbance suppression command turning angle $\delta_{st}^*$ by referring to the following equation based on the target yaw rate $\phi^*$, the wheel base WHEEL_BASE, the vehicle speed V and the vehicle characteristic speed vCh. Here, the vehicle characteristic speed $V_{ch}$ is a parameter in the known "Ackermann's formula", and represents self-steering characteristics of the vehicle.

$$\delta_{st}^* = (\phi^* \times \text{WHEEL\_BASE} \times (1+(V/vCh)^2) \times 180)/(V \times M\_PI)$$

Note that M_PI is a predetermined coefficient.

A limiter processing part 32i limits the maximum value of the disturbance suppression command turning angle $\delta_{st}^*$ and the upper limit of the change rate. The maximum value is a turning angle range (e.g., 0.2° on the left and right sides) of the front wheels 5FL and 5FR corresponding to a range of an allowance around the neutral position when the steering angle of the steering wheel 6 is within an angle range (e.g., 3° on the left and right sides) of the allowance, in a conventional steering device (in which the steering unit is mechanically connected with the turning unit).

Figure 5:
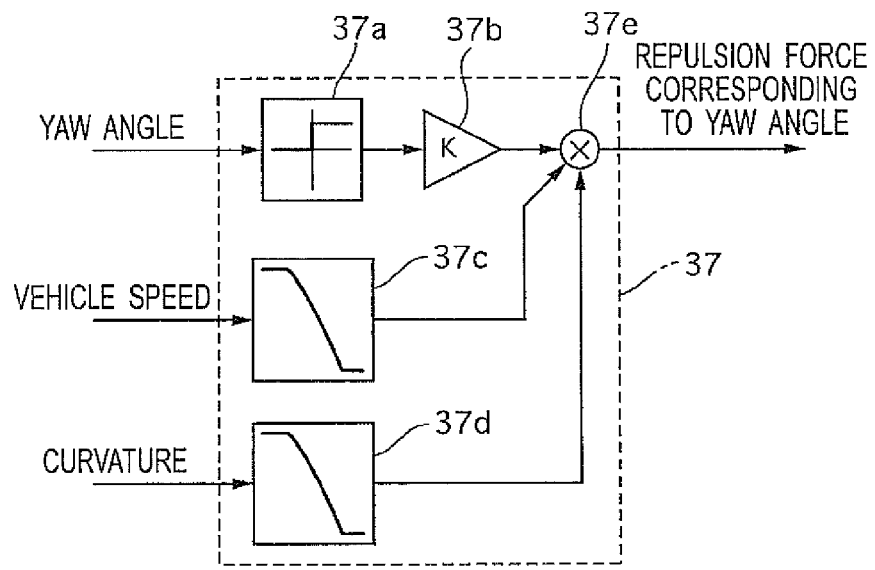
FIG. 5 is a control block diagram of a repulsion force calculation part 37 according to a yaw angle.

FIG. 5 is a control block diagram of the repulsion force calculation part 37 according to the yaw angle. An upper and lower limiter 37a performs upper and lower limitation processing on the yaw angle. When the yaw angle is a positive value (the yaw angle is positive when the white line intersects with the extension of the vehicle traveling direction), the upper and lower limiter sets a value (e.g., 1°) that is not less than a predetermined value that enables suppression of the disturbance and less than a value that causes the vehicle to vibrate and a value generated by steering by the driver. On the other hand, when the yaw angle is a negative value, the upper and lower limiter sets 0.

A yaw angle F/B gain multiplication part 37b multiplies the yaw angle after the limitation processing by a yaw angle F/B gain. The yaw angle F/B gain is not less than a predetermined value that enables responsiveness to be ensured while avoiding insufficient control amount, and less than a value that causes the vehicle to vibrate and a value at which the driver feels a shift in the neutral position between the steering angle and the turning angle.

A vehicle speed correction gain multiplication part 37c multiplies the vehicle speed by a vehicle speed correction gain. The vehicle speed correction gain has characteristics of reaching the maximum value within a range of 0 to 70 km/h, gradually decreasing within a range of 70 to 130 km/h, and reaching the minimum value (0) at 130 km/h or more. A curvature correction gain multiplication part 37d multiplies the curvature by a curvature correction gain. The curvature correction gain has characteristics that the larger the curvature, the smaller the curvature correction gain, and sets the upper limit and lower limit (0). A multiplier 37e obtains a repulsion force corresponding to the yaw angle by multiplying outputs from the yaw angle F/B gain multiplication part 37b, the vehicle speed correction gain multiplication part 37c and the curvature correction gain multiplication part 37d.

Figure 6:
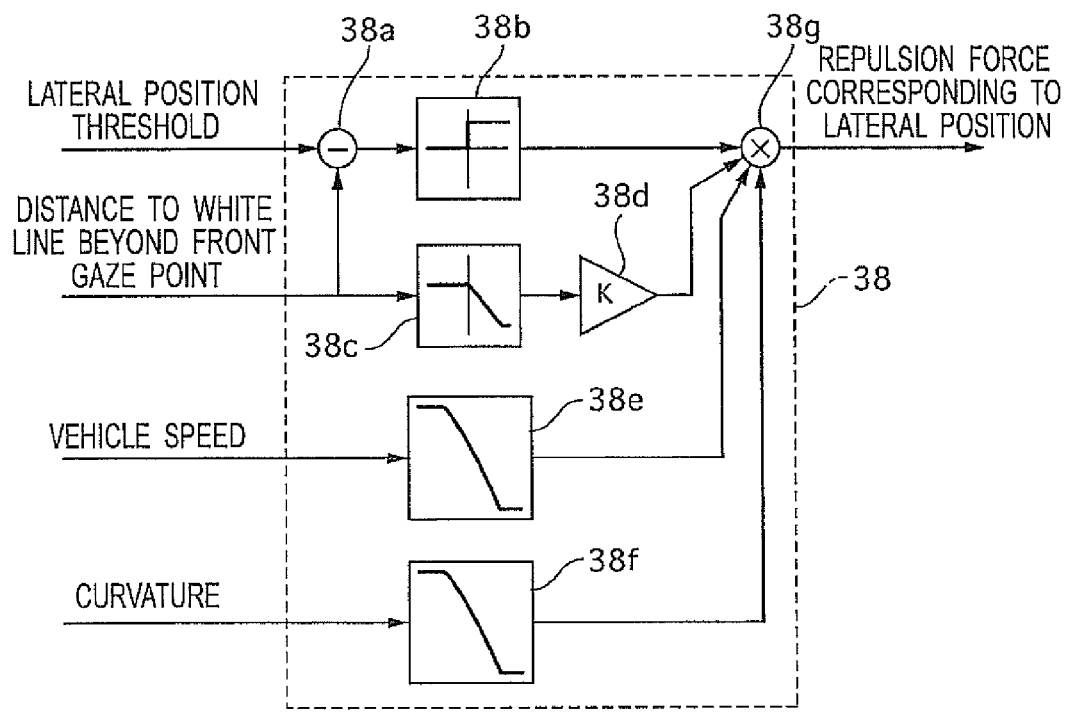
FIG. 6 is a control block diagram of a repulsion force calculation part 38 according to a lateral position.

FIG. 6 is a control block diagram of the repulsion force calculation part 38 according to the lateral position. A subtractor 38a obtains a lateral position deviation by subtracting the distance to the white line beyond the front gaze point from a preset lateral position threshold (e.g., 90 cm). An upper and lower limiter 38b performs upper and lower limitation processing on the lateral position deviation. The upper and lower limiter takes a predetermined positive value when the lateral position deviation is a positive value, and takes 0 when the lateral position deviation is a negative value.

A distance correction gain multiplication part 38c multiplies the distance to the white line beyond the front gaze point by a distance correction gain. The distance correction gain has the following characteristics, and sets the lower limit. Specifically, the distance correction gain takes its maximum value when the distance to the white line is a predetermined value or less. Moreover, when the distance to the white line exceeds the predetermined value, the longer the distance, the smaller the distance correction gain.

A lateral position F/B gain multiplication part 38d multiplies the distance to the white line after the correction by the distance correction gain multiplication part 38c by a lateral position F/B gain. The lateral position F/B gain is not less than a predetermined value that enables responsiveness to be ensured while avoiding insufficient control amount, and less than a value that causes the vehicle to vibrate and a value at which the driver feels a shift in the neutral position. Furthermore, the lateral position F/B gain is set to a value smaller than the yaw angle F/B gain obtained by the yaw angle F/B gain calculation part 37b.

A vehicle speed correction gain multiplication part 38e multiplies the vehicle speed by a vehicle speed correction gain. The vehicle speed correction gain has characteristics of reaching the maximum value within a range of 0 to 70 km/h, gradually decreasing within a range of 70 to 130 km/h, and reaching the minimum value (0) at 130 km/h or more. A curvature correction gain multiplication part 38f multiplies the curvature by a curvature correction gain. The curvature correction gain has characteristics that the larger the curvature, the smaller the curvature correction gain, and sets the upper limit and lower limit (0). A multiplier 38g obtains a repulsion force corresponding to the lateral position by multiplying outputs from the lateral position F/B gain multiplication part 38d, the vehicle speed correction gain multiplication part 38e and the curvature correction gain multiplication part 38f.

[Stability Control Operation]

Figure 7:
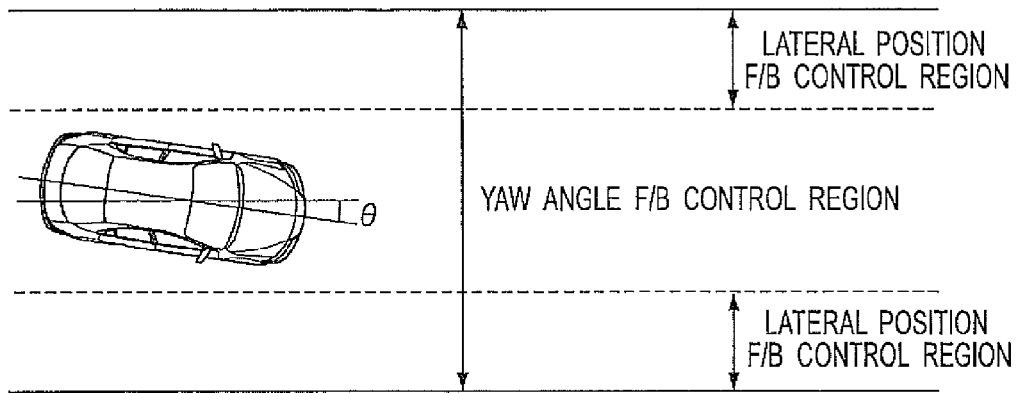
FIG. 7 is a diagram showing control regions of yaw angle F/B control and lateral position F/B control.

In Example 1, as the stability control, the yaw angle F/B control to reduce the yaw angle generated by the disturbance and the lateral position F/B control to reduce the lateral position change that is an integral value of the yaw angle generated by the disturbance are performed. The yaw angle F/B control is performed when the yaw angle is generated regardless of the lateral position. The lateral position F/B control is performed when the distance to the white line reaches a predetermined lateral position threshold (90 cm) or less. More specifically, the vicinity of the center of the driving lane is set as a dead zone of the lateral position F/B control. FIG. 7 shows control regions of the both F/B controls. Here, φ is the yaw angle.

Figure 8:
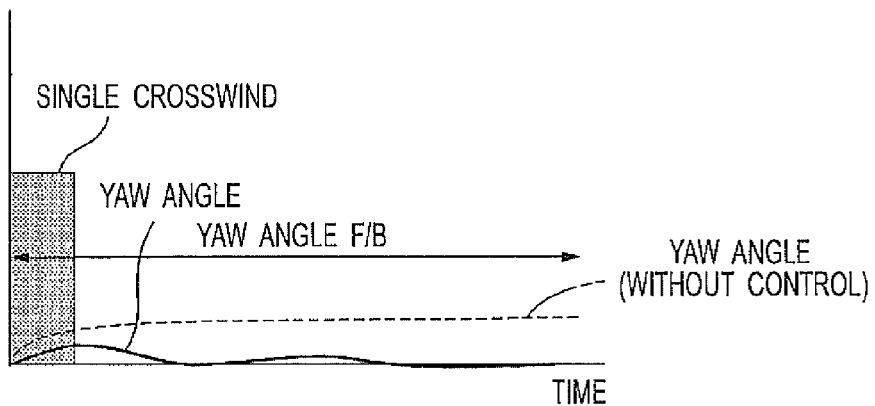
FIG. 8 is a time chart showing changes in the yaw angle when the vehicle driving on a straight road of a highway receives single crosswind.

FIG. 8 is a time chart showing changes in the yaw angle when the vehicle driving on a straight road of a highway receives single crosswind. It is assumed that the vehicle is driving near the center of the driving lane. When the vehicle receives single crosswind and a yaw angle is generated, the yaw angle F/B control is performed, in which a repulsion force corresponding to the yaw angle is calculated, a disturbance suppression command turning angle is calculated to obtain the repulsion force, and the SBW command turning angle based on the steering angle and the vehicle speed is corrected.

When the vehicle is driven along the driving lane, the direction of the white lines coincides with the vehicle traveling direction particularly on the straight road. Thus, the yaw angle becomes zero. More specifically, in the yaw angle F/B control according to Example 1, the generated yaw angle is considered to be one generated by the disturbance. Therefore, by reducing the yaw angle, the vehicle stability against the disturbance particularly during the straight-driving state can be improved. As a result, a correction steering amount by the driver can be reduced.

As a technology of suppressing the influence of disturbance such as crosswind on vehicle behavior, there has heretofore been known a technology of applying a turning torque for suppressing the disturbance to a steering system in a conventional steering device. As for the SBW system, there has been known a technology of applying a steering reaction force component that encourages turning for suppressing the disturbance to the steering wheel. However, in such conventional steering devices, variations in the steering reaction force cause the driver to feel discomfort.

On the other hand, the stability control including the yaw angle F/B control according to Example 1 focuses on the point that the steering wheel 6 and the front wheels 5L and 5R can be controlled independently of each other, which is one of the characteristics of the SBW system in which the steering wheel 6 and the front wheels 5L and 5R are mechanically uncoupled from each other. In the stability control, the turning angle of the front wheels 5L and 5R is controlled based on the command turning angle obtained by adding up the SBW command turning angle corresponding to the steering angle and the vehicle speed and the disturbance suppression command turning angle corresponding to the yaw angle. Moreover, the tire lateral force is estimated based on the steering angle and the vehicle speed, and the steering reaction force is controlled based on the command steering reaction force corresponding to the estimated tire lateral force and the vehicle speed.

More specifically, since the turning angle for disturbance suppression is applied directly to the front wheels 5L and 5R, it is no longer required to apply the steering reaction force component that encourages turning to suppress the disturbance. Furthermore, by applying the steering reaction force corresponding to the tire lateral force estimated from the steering angle, variations in the tire lateral force caused by the turning to suppress the disturbance are not reflected on the steering reaction force. Thus, the sense of discomfort experienced by the driver can be reduced. In the conventional SBW system, the tire lateral force is estimated from a rack axial force detected by a sensor or the turning angle, and a steering reaction force corresponding to the estimated tire lateral force is applied. Therefore, variations in the tire lateral force caused by the turning to suppress the disturbance are always reflected on the steering reaction force, resulting in a sense of discomfort experienced by the driver. Meanwhile, in Example 1, only the tire lateral force caused by steering by the driver is reflected on the steering reaction force, and the turning for disturbance suppression causes no variations in the steering reaction force. Thus, the sense of discomfort experienced by the driver can be reduced.

Here, when the turning angle for disturbance suppression is applied directly to the front wheels 5L and 5R, a shift in the neutral position between the steering angle and the turning angle becomes a problem. However, in Example 1, the disturbance suppression command turning angle is set within the turning angle range (0.2° on the left and right sides) of the front wheels 5FL and 5FR corresponding to the range of the allowance around the neutral position of the steering angle when the steering wheel 6 is located within the angle range (3° on the left and right sides) of the allowance, in a conventional steering device. The generation of the yaw angle by the disturbance is more significant in the straight-driving state than in the turning state. In the straight-driving state, the steering angle is located in the vicinity of the neutral position of the steering angle. More specifically, in many cases, the correction of the turning angle by the yaw angle F/B control is performed in the vicinity of the steering angle neutral position. Therefore, by suppressing the neutral position shift amount between the steering angle and the turning angle associated with the application of the disturbance suppression command turning angle within the range of the allowance of steering, a sense of discomfort caused by the shift in the neutral position can be suppressed.

Moreover, since the disturbance suppression command turning angle is limited within the range of 0.2° on the left and right sides, the driver can change the vehicle traveling direction to a desired direction by steering input even during the stability control. More specifically, the correction amount of the turning angle by the disturbance suppression command turning angle is minute compared with the change amount in the turning angle caused by the steering input by the driver. Thus, the vehicle stability against the disturbance can be improved without hindering the steering by the driver.

As control of lateral movement of the vehicle, there have heretofore been known lane departure prevention control in which a yaw moment to prevent the vehicle from departing from the lane is applied to the vehicle when it is detected that the vehicle has a tendency to depart from the driving lane as well as lane keep control in which a yaw moment is applied to the vehicle so that the vehicle travels near the center of the driving lane. However, the lane departure prevention control is control having a control intervention threshold, and is not initiated near the center of the driving lane. Therefore, the vehicle stability against the disturbance cannot be ensured. Moreover, the control intervention is performed by the threshold even when the driver wishes to pull over the vehicle to the side of the driving lane. This causes the driver to feel irritated. Meanwhile, the lane keep control is control having a target position (target line), and can ensure the vehicle stability against the disturbance. However, in the lane keep control, the vehicle cannot be driven in a line that deviates from the target line. In addition, reduction in force of the driver gripping the steering wheel is determined to be a hands-free state, and thus the control is cancelled. Therefore, the driver needs to always grip the steering wheel with a certain amount of force or more. This results in a large steering load on the driver.

On the other hand, the yaw angle F/B control according to Example 1 has no control intervention threshold, and thus can realize a seamless control to always ensure the stability against the disturbance. Furthermore, the yaw angle F/B control has no target position, and thus allows the driver to drive the vehicle in a desired line. In addition, the control is not cancelled even when the steering wheel 6 is lightly gripped. The steering load on the driver can be reduced.

Figure 9:
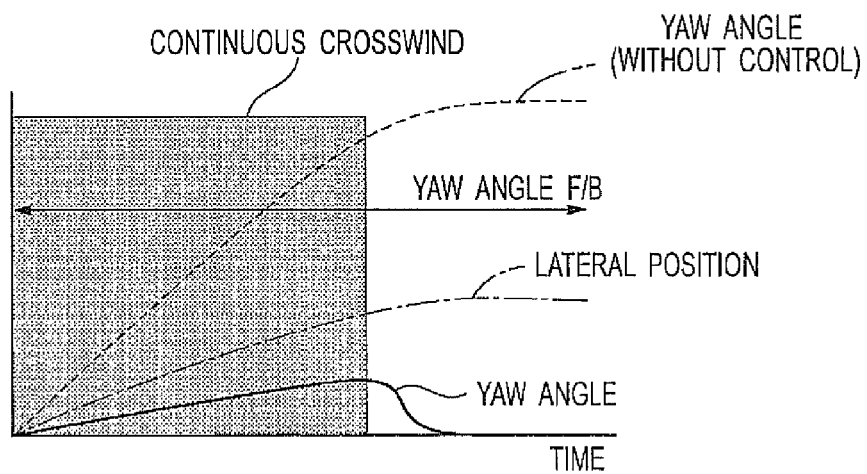
FIG. 9 is a time chart showing changes in the yaw angle and lateral position when the lateral position F/B control is not performed in the case where the vehicle driving on a straight road of a highway receives continuous crosswind.

FIG. 9 is a time chart showing changes in the yaw angle and lateral position when the lateral position F/B control is not performed in the case where the vehicle driving on a straight road of a highway receives continuous crosswind. It is assumed that the vehicle is driving near the center of the driving lane. When the vehicle receives continuous crosswind and a yaw angle is generated, the yaw angle is reduced by the yaw angle F/B control, but the vehicle strays to the side due to the continuous disturbance. This is because the yaw angle F/B control is to reduce the yaw angle, and the turning angle is not corrected when the yaw angle is zero. Therefore, the lateral position change that is the integral value of the yaw angle generated by the disturbance cannot be directly reduced. Note that the lateral position change can be indirectly suppressed (increase in the integral value of the yaw angle can be suppressed) by setting a large value as the repulsion force corresponding to the yaw angle. However, the maximum value of the disturbance suppression command turning angle is limited to 0.2° on the left and right sides so as not to cause the driver to feel discomfort. Thus, it is difficult to effectively prevent the vehicle from straying to the side only by performing the yaw angle F/B control. Furthermore, the yaw angle F/B gain to obtain the repulsion force corresponding to the yaw angle requires convergence of the yaw angles before the driver notices changes in the yaw angle, and thus takes a maximum value, which on the other hand, causes the vehicle to vibrate as it is. Therefore, the yaw angle by which the yaw angle F/B gain is multiplied is limited to the upper limit (1°) or less by the upper and lower limiter 37*a*. More specifically, the repulsion force corresponding to the yaw angle is a repulsion force corresponding to a yaw angle smaller than an actual yaw angle. This can also explain that it is difficult to effectively prevent the vehicle from straying to the side only by performing the yaw angle F/B control.

Figure 10:
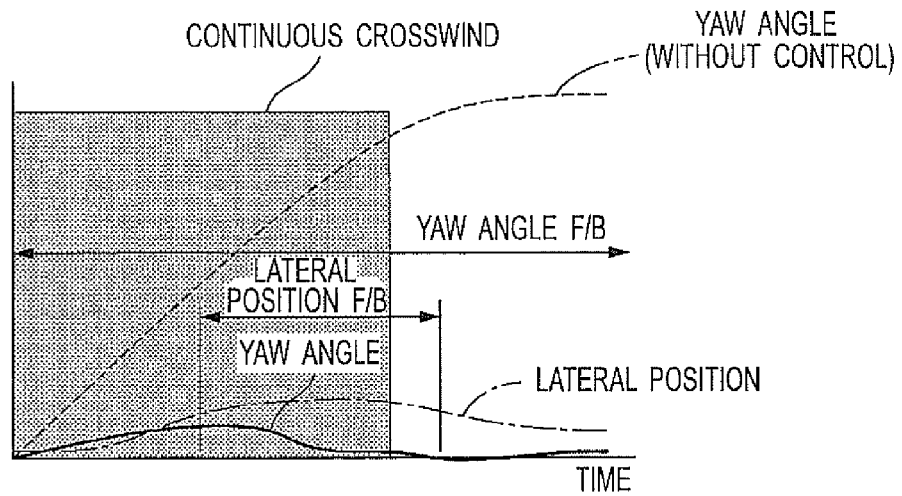
FIG. 10 is a time chart showing changes in the yaw angle and lateral position when the lateral position F/B control is performed in the case where the vehicle driving on a straight road of a highway receives continuous crosswind.

Therefore, in the stability control according to Example 1, the lateral position F/B control is introduced to prevent the vehicle from straying to the side due to steady disturbance. FIG. 10 is a time chart showing changes in the yaw angle and lateral position when the lateral position F/B control is performed in the case where the vehicle driving on a straight road of a highway receives continuous crosswind. In the lateral position F/B control, the vehicle driving near the center of the driving lane receives continuous crosswind and strays to the side, and a repulsion force corresponding to a lateral position change (≈yaw angle integral value) is calculated when the distance to the white line becomes a lateral position threshold or less. The disturbance suppression command turning angle calculation section 32 corrects the SBW command turning angle by calculating the disturbance suppression command turning angle based on the lateral direction repulsion force obtained by adding up the repulsion force corresponding to the lateral position and the repulsion force corresponding to the yaw angle. More specifically, in the lateral position F/B control, the SBW command turning angle is corrected using the disturbance suppression command turning angle corresponding to the lateral position. Thus, the lateral position change caused by the steady disturbance can be directly reduced, and the vehicle can be prevented from straying to the side. In other words, the vehicle driving position, for which the yaw angle F/B control is performed, can be returned to the vicinity of the center of the driving lane, which is the dead zone of the lateral position F/B control.

As described above, the stability control according to Example 1 can improve the vehicle stability against both transient and steady disturbances by performing the yaw angle F/B control to reduce the yaw angle change caused by the transient disturbance and performing the lateral position F/B control to reduce the yaw angle integral value (lateral position change) caused by the steady disturbance.

Furthermore, in the stability control according to Example 1, the vehicle behavior caused by the control (application of the disturbance suppression command turning angle) is limited to an extent not noticed by the driver and to an extent not inhibiting a vehicle behavior change caused by steering by the driver. Also, a change in self-aligning torque caused by the control is not reflected on the steering reaction force. Thus, the stability control can be performed without making the driver aware of the stability control being executed. As a result, the behavior of the vehicle having vehicle body specifications as if the vehicle has excellent stability against disturbance can be simulated.

Note that the lateral position F/B gain to obtain the repulsion force corresponding to the lateral position in the lateral position F/B control is set to have a value smaller than the yaw angle F/B gain. As described above, the yaw angle F/B control is required to have high responsiveness because of the need to converge the yaw angles before the driver perceives the yaw angle change caused by transient disturbance. On the other hand, the lateral position F/B control is required to stop an increase in the lateral position change, and it takes time for the lateral position to change due to accumulation of the yaw angle integral values. Thus, the lateral position F/B control does not need responsiveness as high as that of the yaw angle F/B control. In addition, if the lateral position F/B gain is increased, the control amount varies significantly depending on the degree of the disturbance, causing the driver to feel discomfort.

[Lateral Force Offset Section]

Figure 11:
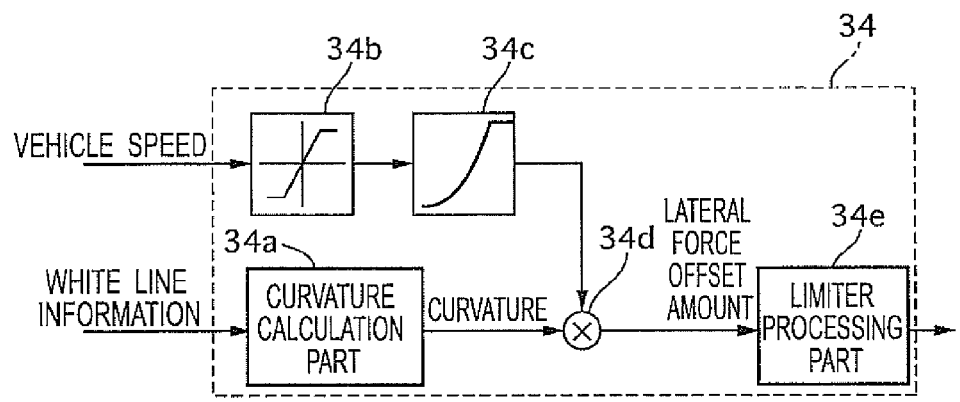
FIG. 11 is a control block diagram of a lateral force offset section 34.

FIG. 11 is a control block diagram of the lateral force offset section 34. A curvature calculation part 34a calculates a curvature of the white line at the front gaze point. An upper and lower limiter 34b performs upper and lower limitation processing on the vehicle speed. A SAT gain calculation part 34c calculates a SAT gain corresponding to the vehicle speed, based on the vehicle speed after the limitation processing. The SAT gain has characteristics that the higher the vehicle speed, the larger the gain, and sets the upper limit. A multiplier 34d obtains a lateral force offset amount by multiplying the SAT gain by the curvature. A limiter processing part 34e limits the maximum value of the lateral force offset amount and the upper limit of the change rate. For example, the maximum value is 1,000 N and the upper limit of the change rate is 600 N/s.

[Reaction Force Offset Control Operation According to Curvature]

Figure 12:
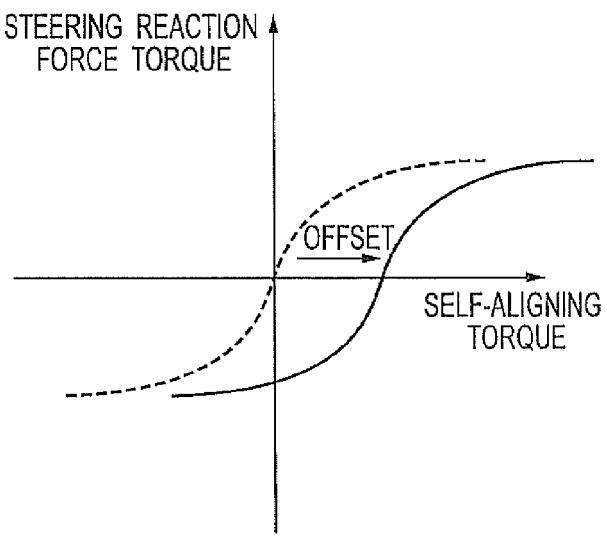
FIG. 12 is a diagram showing a state where steering reaction force characteristics indicating steering reaction force torque corresponding to a self-aligning torque are offset in the same direction as the self-aligning torque.

In the reaction force offset control according to the curvature, the lateral force offset amount that increases with an increase in the curvature of the white line is obtained, and the obtained lateral force offset amount is subtracted from the tire lateral force. Thus, steering reaction force characteristics representing the steering reaction force torque corresponding to the tire lateral force calculated by the SAT calculation section 35, i.e., the steering reaction force torque corresponding to the self-aligning torque are offset in the same sign direction as the self-aligning torque as the curvature of the white line is increased, as shown in FIG. 12. Note that FIG. 12 shows the case of a right-hand curve and, in the case of a left-hand curve, the steering reaction force characteristics are offset in a direction opposite to that shown in FIG. 12.

Figure 13:
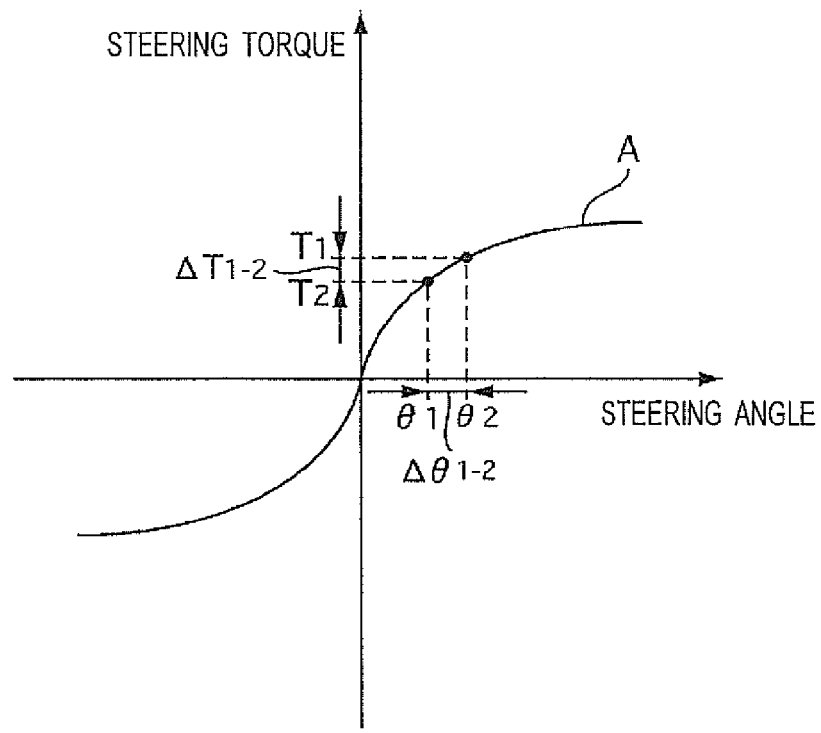
FIG. 13 is a characteristic diagram showing a relationship between a steering angle of a steering wheel and a steering torque of a driver.

Conventionally, in the SBW system in which the steering unit and the turning unit are mechanically uncoupled from each other, steering reaction force characteristics are set to simulate the steering reaction force corresponding to the self-aligning torque in the conventional steering device, and the steering reaction force is applied to the steering wheel based on the steering reaction force characteristics. In this event, the relationship between the steering angle of the steering wheel and the steering torque of the driver has characteristic A as shown in FIG. 13. More specifically, the larger the absolute value of the steering angle, the larger the absolute value of the steering torque. Also, the smaller the absolute value of the steering angle, the larger the change amount of the steering torque relative to the change amount of the steering angle compared with the case of a larger absolute value of the steering angle.

Here, a case is considered where the driver changes the maintained steering torque to correct the course during turning. In FIG. 13, the maintained steering torque is reduced to $T_2$ from a state where the driver maintains a steering angle $\theta_1$ with a maintained steering torque $T_1$, the steering angle becomes $\theta_2$ and the turning angle of the front wheels 5L and 5R is reduced by the reduction in the steering angle. In this event, according to the steering reaction force characteristics in the SBW system described above, the larger the curvature of the curve, the larger the change in the steering angle relative to the change in the maintained steering torque. More specifically, the larger the curvature of the curve, the higher the sensitivity of the vehicle to the steering torque. This leads to a problem of difficulty in correcting the course.

Figure 14:
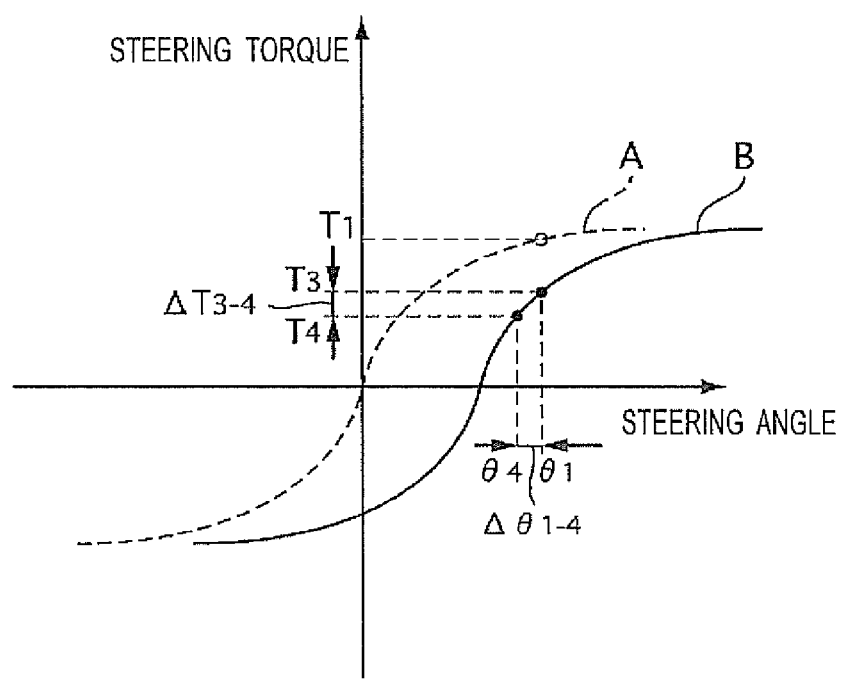
FIG. 14 is a diagram showing a state where characteristics indicating a relationship between the steering angle of the steering wheel and the steering torque of the driver are changed by offsetting the steering reaction force characteristics indicating the steering reaction force torque corresponding to the self-aligning torque in the same direction as the self-aligning torque.

Meanwhile, in the reaction force offset control according to the curvature in Example 1, with an increase in the curvature of the white line, the steering reaction force characteristics indicating the steering reaction force torque corresponding to the self-aligning torque are offset in the same sign direction as the self-aligning torque. Accordingly, the characteristics indicating the relationship between the steering angle and the steering torque are offset in the same sign direction as the steering angle as shown in FIG. 14, and are changed from characteristic A to characteristic B. Thus, the larger the curvature of the white line, the smaller the change amount in the steering angle relative to the change amount in the maintained steering torque. Even when the driver reduces the maintained steering torque to T4 and the reduction amount $\Delta T_{3-4}$ of the maintained steering torque is the same as the reduction amount $\Delta T_{1-2}$ in the conventional technology shown in FIG. 13, the reduction amount $\Delta \theta_{1-4}$ of the steering angle becomes smaller than the reduction amount $\Delta \theta_{1-2}$ in the conventional technology. More specifically, the larger the curvature of the curve, the smaller the change in the steering angle can be relative to the change in the maintained steering torque. Therefore, the sensitivity of the vehicle to the steering torque can be reduced. Thus, the vehicle behavior change becomes gradual, and the driver can more easily correct the course. Moreover, the maintained steering torque $T_3$ ($<T_1$) to maintain the steering angle $\theta_1$ can be reduced to be smaller than that in the conventional technology. Thus, the steering load on the driver during turning can be reduced.

There has heretofore been known a technology of reducing the slope of the steering reaction force characteristics along with the increased curvature of the white line, for the purpose of reducing the steering load on the driver during turning. However, in the conventional technology, the larger the curvature, the larger the change in the steering angle relative to the change in the maintained steering torque. As a result, the sensitivity of the vehicle to the steering torque is increased. More specifically, reduction in the steering load on the driver during turning and facilitation of the course correction can be both realized by offsetting the steering reaction force characteristics in the same direction as the self-aligning torque according to the curvature of the white line.

[Steering Reaction Force Torque Offset Section]

Figure 15:
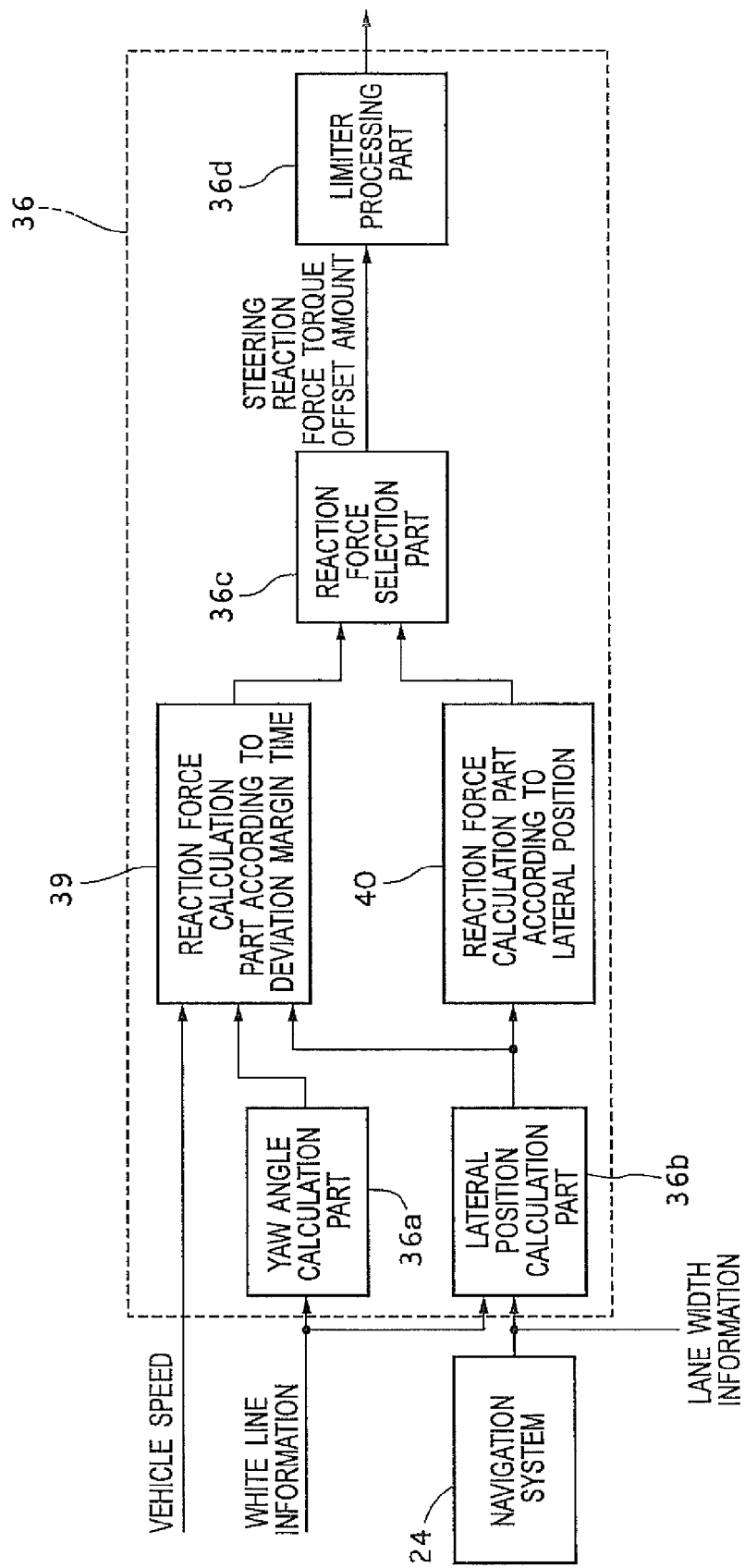
FIG. 15 is a control block diagram of a steering reaction force torque offset section 36.

FIG. 15 is a control block diagram of the steering reaction force torque offset section 36. A yaw angle calculation part 36*a* calculates a yaw angle at the front gaze point. The yaw angle can be easily and accurately detected by calculating the yaw angle based on the image of the driving road shot by the camera 17.

A lateral position calculation part 36*b* calculates lateral positions relative to the left and right white lines at the front gaze point and lateral positions relative to the left and right white lines at the current position. Here, when the own vehicle moves across the white line to the next driving lane, i.e., when a lane change is made, the lateral position calculation part 36*b* switches between the lateral positions relative to the left and right white lines at the current position. More specifically, the lateral position relative to the left white line before the white line is reached is switched to the lateral position relative to the right white line after the white line is reached. Also, the lateral position relative to the right white line before the white line is reached is switched to the lateral position relative to the left white line after the white line is reached. Note that, when a lane change is made to a driving lane having a different lane width, the lateral positions are corrected by multiplying the switched lateral position by a value $W_2/W_1$ obtained by dividing a lane width $W_2$ of the driving lane after the lane change by a lane width $W_1$ of the driving lane before the lane change. Here, lane width information of each driving lane is acquired from the navigation system 24.

A reaction force calculation part 39 according to deviation margin time calculates a reaction force corresponding to deviation margin time based on the vehicle speed, the yaw angle and the lateral positions relative to the left and right white lines at the front gaze point. The reaction force calculation part 39 according to the deviation margin time is described in detail later. A reaction force calculation part 40 according to the lateral position calculates a reaction force corresponding to the lateral position, based on the lateral positions relative to the left and right white lines at the current position. The reaction force calculation part 40 according to the lateral position is described in detail later. A reaction force selection part 36*c* selects the reaction force having a larger absolute value between the reaction force corresponding to the deviation margin time and the reaction force corresponding to the lateral position, as a steering reaction force torque offset amount. A limiter processing part 36*d* limits the maximum value of the steering reaction force torque offset amount and the upper limit of the change rate. For example, the maximum value is 2 Nm and the upper limit of the change rate is 10 Nm/s.

Figure 16:
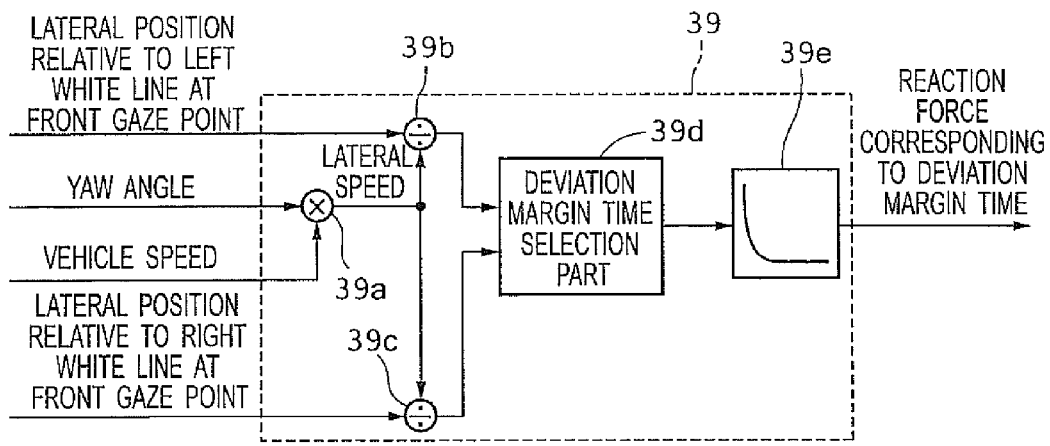
FIG. 16 is a control block diagram of a reaction force calculation part 39 according to deviation margin time.

FIG. 16 is a control block diagram of the reaction force calculation part 39 according to the deviation margin time. A multiplier 39*a* obtains a lateral speed of the vehicle by multiplying the yaw angle by the vehicle speed. A divider 39*b* obtains a deviation margin time for the left white line by dividing the lateral position relative to the left white line at the front gaze point by the lateral speed. A divider 39*c* obtains a deviation margin time for the right white line by dividing the lateral position relative to the right white line at the front gaze point by the lateral speed. A deviation margin time selection part 39*d* selects the shorter deviation margin time between the deviation margin times for the left and right white lines, as the deviation margin time. A reaction force calculation part 39*e* according to the deviation margin time calculates a reaction force corresponding to the deviation margin time, based on the deviation margin time. The reaction force corresponding to the deviation margin time is inversely proportional to the deviation margin time (proportional to the reciprocal of the deviation margin time), and has characteristics of becoming almost zero in 3 seconds or more.

Figure 17:
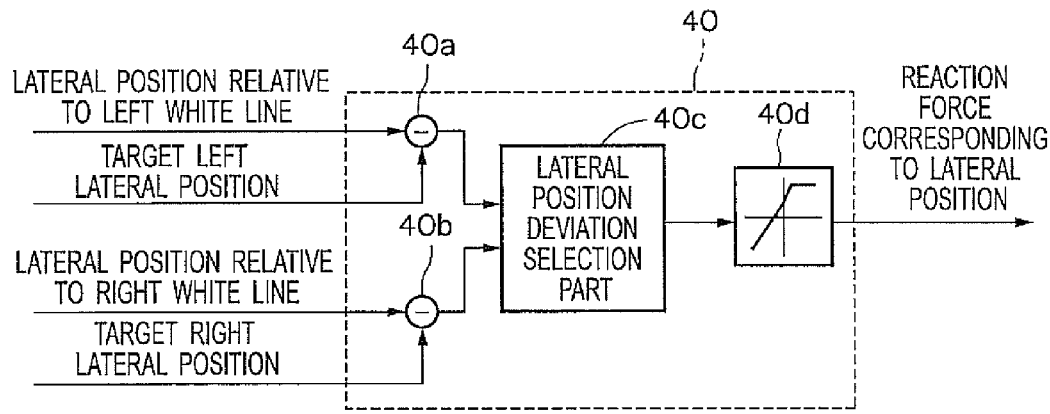
FIG. 17 is a control block diagram of a reaction force calculation part 40 according to the lateral position.

FIG. 17 is a control block diagram of the reaction force calculation part 40 according to the lateral position. A subtractor 40*a* obtains a lateral position deviation relative to the left lane by subtracting the lateral position relative to the left lane from a preset target left lateral position (e.g., 90 cm). A subtractor 40*b* obtains a lateral position deviation relative to the right lane by subtracting the lateral position relative to the right lane from a preset target right lateral position (e.g., 90 cm). A lateral position deviation selection part 40*c* selects the larger lateral position deviation between the lateral position deviations relative to the left and right lanes. A reaction force calculation part 40*d* according to the lateral position deviation calculates a reaction force corresponding to the lateral position, based on the lateral position deviation. The reaction force corresponding to the lateral position has characteristics that the larger the lateral position deviation, the larger the reaction force, and sets the upper limit.

[Reaction Force Offset Control Operation According to Lateral Position]

In the reaction force offset control according to the lateral position, the reaction force corresponding to the lateral position is added, as the steering reaction force torque offset amount, to the steering reaction force torque. Accordingly, the steering reaction force characteristics indicating the steering reaction force torque corresponding to the self-aligning torque are offset in a direction in which the absolute value of the steering reaction force torque is increased with a reduction in the distance to the white line, as shown in FIG. 18.

Figure 18:
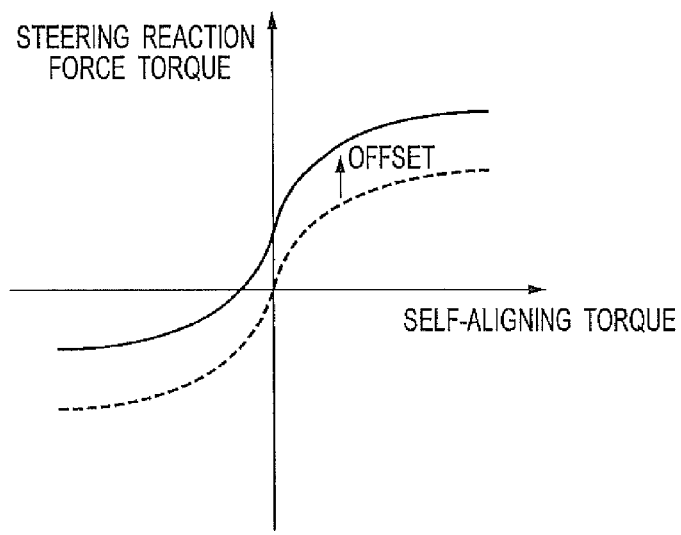
FIG. 18 is a diagram showing a state where the steering reaction force characteristics indicating the steering reaction force torque corresponding to the self-aligning torque are offset in a direction in which the absolute value of the steering reaction force torque is increased.

Note that FIG. 18 shows the case where the vehicle is closer to the right lane and, in the case where the vehicle is closer to the left lane, the steering reaction force characteristics are offset in a direction opposite to that shown in FIG. 18.

Figure 19:
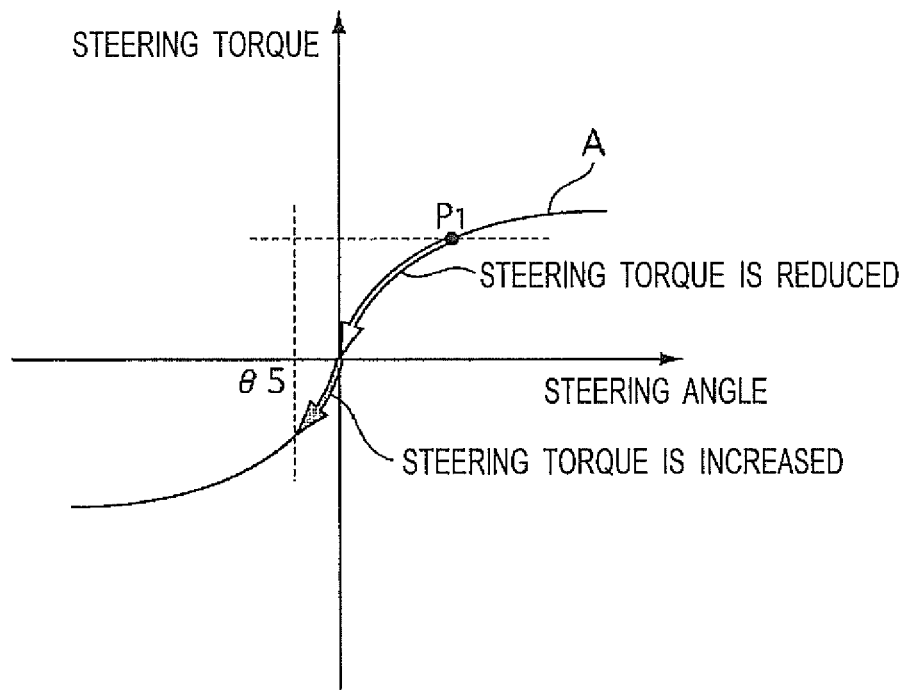
FIG. 19 is a characteristic diagram showing a relationship between the steering angle of the steering wheel and the steering torque of the driver.

Here, a case is considered where, in the conventional steering reaction force control, a sudden rightward turning operation by the driver shifts the vehicle driving position to the right and then the driver performs corrective steering to return the driving position to the vicinity of the center of the driving lane. It is assumed that the steering angle and steering torque when the sudden operation is performed by the driver are at the position of point $P_1$ on characteristic A in FIG. 19. Characteristic A is a characteristic indicating a relationship between the steering angle and the steering torque when the steering reaction force characteristics are set by simulating a conventional steering device, as in the case of FIG. 13. In order to return the driving position to the vicinity of the center of the driving lane from this state, the front wheels need to be turned to the left. Thus, the driver performs a turning back operation to the steering angle neutral position and then performs a turning operation from the steering angle neutral position, thereby aligning the steering wheel with the target angle $\theta_5$. In this event, in the conventional technology, the steering angle neutral position (steering angle zero point) coincides with the steering torque neutral position (steering torque zero point). Thus, the steering torque needs to be reduced up to the steering angle neutral position and then increased when the driving position exceeds the steering angle neutral position. More specifically, in the case of performing corrective steering over the steering angle neutral position, the sign of the steering torque is inverted, and a direction of controlling the force by the driver is switched. Moreover, the change amount of the steering angle relative to the change amount of the steering torque is significantly small in the vicinity of the steering torque neutral position compared with the other steering angle regions. Therefore, the steering load on the driver is large, and it is difficult to control the steering wheel at the target angle $\theta_5$. Thus, the vehicle driving position is likely to be overshot, leading to a problem of increased corrective steering amount.

Figure 20:
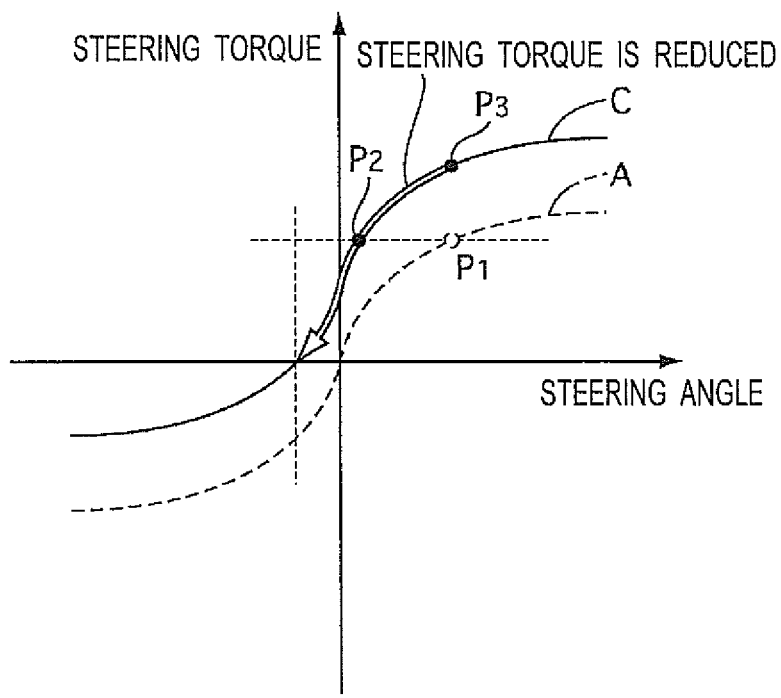
FIG. 20 is a diagram showing a state where characteristics indicating a relationship between the steering angle of the steering wheel and the steering torque of the driver are changed by offsetting the steering reaction force characteristics indicating the steering reaction force torque corresponding to the self-aligning torque in the direction in which the absolute value of the steering reaction force torque is increased.

On the other hand, in the reaction force offset control according to the lateral position in Example 1, the steering reaction force torque corresponding to the self-aligning torque is offset in the direction in which the absolute value of the steering reaction force torque is increased with a shorter distance to the white line. As a result, the characteristics indicating a relationship between the steering angle and the steering torque are offset in a direction in which the absolute value of the steering torque is increased, as shown in FIG. 20, and continuously changed from characteristic A to characteristic C as the distance to the white line is reduced. In this event, in order to maintain the steering angle, the steering torque needs to be increased. If the steering torque is constant, the steering wheel 6 is gradually returned to the steering angle neutral position (point $P_1$ to point $P_2$). Thus, the vehicle driving position can be prevented from being shifted to the right by a sudden turning operation by the driver. On the other hand, when the steering angle is maintained by the driver, the steering angle and the steering torque are moved from point $P_1$ to point $P_3$. When the driver performs corrective steering from this state, the sign of the steering torque is not inverted until the vehicle driving position reaches the steering torque neutral position during a turning operation from the steering angle neutral position, since the steering torque neutral position is offset to the turning side than the steering angle neutral position in characteristic C. Therefore, the driver can control the turning angle of the front wheels 5L and 5R just by reducing the steering torque and stopping the rotation of the steering wheel 6 when the steering wheel 6 comes to the target angle. More specifically, in the reaction force offset control according to the lateral position in Example 1, the direction of controlling the force by the driver is not likely to be switched. Thus, the corrective steering by the driver can be facilitated. As a result, the vehicle driving position becomes less likely to be overshot, and thus the corrective steering amount can be reduced.

There has heretofore been known a technology of increasing a steering reaction force to such an extent as to come closer to the white line for the purpose of suppressing a shift in a driving position due to a sudden operation by a driver. In the conventional technology, the steering wheel is just increased in weight as the driving position approaches the white line. Since the steering torque neutral position in the steering reaction force characteristics always coincides with the steering angle neutral position, the sign of the steering torque is inverted in the corrective steering over the steering angle neutral position. As a result, the steering load on the driver is not reduced. More specifically, suppression of the shift in the driving position and reduction in the steering load on the driver can be both realized by offsetting the steering reaction force torque corresponding to the self-aligning torque in a direction in which the absolute value of the steering reaction force torque is increased with a shorter distance to the white line.

In the reaction force offset control according to the lateral position in Example 1, the shorter the distance to the white line, the larger the offset amount. Therefore, the steering torque neutral position is offset to a position more distant from the steering angle neutral position with a shorter distance to the white line. When the driver performs corrective steering to return the vehicle driving position to the vicinity of the center of the driving lane, the turning operation amount from the steering angle neutral position needs to be increased as the driving position is closer to the white line. In this event, when the offset amount of the steering torque neutral position relative to the steering angle neutral position is small, there is a possibility that the steering torque exceeds the neutral position and the sign of the steering torque is inverted before the steering wheel comes to the target angle. Therefore, the steering torque can be prevented from exceeding the neutral position by increasing the offset amount with a shorter distance to the white line.

In the reaction force offset control according to the lateral position in Example 1, the lateral position calculation part 36b switches between the lateral positions relative to the left and right white lines at the current position, when the own vehicle reaches the white line. In the reaction force offset control according to the lateral position, the own vehicle more easily returns to the vicinity of the center of the driving lane by increasing the steering reaction force as the own vehicle moves farther from the vicinity of the center of the driving lane. More specifically, the yaw angle integral value (lateral position change) is recognized as the disturbance, and the steering reaction force is controlled so as to guide the vehicle in a direction in which the yaw angle integral value becomes zero. For this reason, when a lane change is made, the yaw angle integral value needs to be reset. If the yaw angle integral value is not reset, the steering reaction force to return the vehicle to the vicinity of the center of the driving lane before the lane change keeps acting even after the lane change. This inhibits the operations by the driver. Note that the vehicle cannot be guided to the vicinity of the center of the driving lane after the lane change only by setting the integral value to zero.

Therefore, in Example 1, when the own vehicle reaches the white line, the operation can be recognized as an intended operation by the driver. In such a case, the lateral positions relative to the left and right white lines at the current position are switched. In other words, by inverting the sign of the yaw angle integral value, the position to which the own vehicle is guided is changed from the vicinity of the center of the driving lane before the lane change to the vicinity of the center of the driving lane after the lane change. Thus, the steering reaction force can be generated to guide the own vehicle to the vicinity of the center of the driving lane after the lane change. In this event, by taking into consideration the ratio $W_2/W_1$ of the lane width $W_2$ of the driving lane after the lane change to the lane width $W_1$ of the driving lane before the lane change, an accurate lateral position can be set, and an optimum offset amount for guiding the own vehicle to the vicinity of the center of the driving lane can be set.

[Reaction Force Offset Control Operation According to Deviation Margin Time]

In the reaction force offset control according to the deviation margin time, the reaction force corresponding to the deviation margin time is added as the steering reaction force torque offset amount to the steering reaction force torque. Thus, the steering reaction force characteristics indicating the steering reaction force torque corresponding to the self-aligning torque are offset in a direction in which the shorter the deviation margin time, the larger the absolute value of the steering reaction force torque, as shown in FIG. 18. Note that FIG. 18 shows the case where the vehicle is closer to the right lane and, in the case where the vehicle is closer to the left lane, the steering reaction force characteristics are offset in a direction opposite to that shown in FIG. 18.

As a result, the characteristics indicating the relationship between the steering angle and the steering torque are offset in the direction in which the absolute value of the steering torque is increased, as shown in FIG. 20, and continuously changed from characteristic A to characteristic C as the deviation margin time is reduced. In this event, in order to maintain the steering angle, the steering torque needs to be increased. If the steering torque is constant, the steering wheel 6 is gradually returned to the steering angle neutral position (point $P_1$ to point $P_2$). Thus, the vehicle driving position can be prevented from being shifted to the right by a sudden turning operation by the driver. On the other hand, when the steering angle is maintained by the driver, the steering angle and the steering torque are moved from point $P_1$ to point $P_3$. When the driver performs corrective steering from this state, the sign of the steering torque is not inverted until the vehicle driving position reaches the steering torque neutral position during a turning operation from the steering angle neutral position, since the steering torque neutral position is offset to the turning side than the steering angle neutral position in characteristic C. Therefore, the driver can control the turning angle of the front wheels 5L and 5R just by reducing the steering torque and stopping the rotation of the steering wheel 6 when the steering wheel 6 comes to the target angle. More specifically, in the reaction force offset control according to the deviation margin time in Example 1, the direction of controlling the force by the driver is not likely to be switched. Thus, the corrective steering by the driver can be facilitated. As a result, the vehicle driving position becomes less likely to be overshot, and thus the corrective steering amount can be reduced.

In the reaction force offset control according to the deviation margin time in Example 1, the shorter the deviation margin time, the larger the offset amount. Thus, the steering torque neutral position is offset to a position farther away from the steering angle neutral position with a shorter deviation margin time. When the driver performs corrective steering to return the vehicle driving position to the vicinity of the center of the driving lane, the shorter the deviation margin time, the higher the possibility of the vehicle driving position being close to the white line. The closer to the white line, the more the turning operation amount from the steering angle neutral position needs to be increased. In this event, when the offset amount of the steering torque neutral position relative to the steering angle neutral position is small, there is a possibility that the steering torque exceeds the neutral position and the sign of the steering torque is inverted before the steering wheel comes to the target angle. Therefore, the steering torque can be prevented from exceeding the neutral position by increasing the offset amount with a shorter distance to the white line.

[Effects Achieved By Combination of Reaction Force Offset Controls According to Lateral Position and Deviation Margin Time]

In the steering reaction force control unit 20, the steering reaction force torque offset section 36 selects the reaction force having a larger absolute value between the reaction force corresponding to the deviation margin time and the reaction force corresponding to the lateral position, as the steering reaction force torque offset amount. The adder 20c adds the steering reaction force torque offset amount to the steering reaction force torque. Thus, the steering reaction force characteristics are offset in the direction in which the absolute value of the steering reaction force torque is increased, according to the deviation margin time or the lateral position.

In the reaction force offset control according to the deviation margin time, when the own vehicle is parallel to the white line, i.e., when the yaw angle is zero, the reaction force corresponding to the deviation margin time is zero. For this reason, only a small reaction force can be generated when the yaw angle is small even if the own vehicle is at a position close to the white line. On the other hand, in the reaction force offset control according to the lateral position, the reaction force (reaction force corresponding to the lateral position) is generated in proportion to the distance to the white line. Thus, the shorter the distance to the white line, the larger the reaction force can be generated. Accordingly, the own vehicle can be more easily returned to the vicinity of the center of the driving lane.

On the other hand, in the reaction force offset control according to the lateral position, when the own vehicle is near the center of the driving lane, the reaction force corresponding to the lateral position is zero. Therefore, the vehicle reaches the white line in a short time when the yaw angle is large and the vehicle speed is high even if the vehicle is near the center of the driving lane. However, it is difficult to increase the steering reaction force with good responsiveness. On the other hand, the reaction force offset control according to the deviation margin time has characteristics that the reaction force (reaction force corresponding to the deviation margin time) is generated according to the deviation margin time, and the reaction force rapidly rises when the deviation margin time becomes 3 seconds or less. Thus, even when the vehicle reaches the white line in a short time, lane departure can be suppressed by increasing the steering reaction force with good responsiveness.

Therefore, by performing both the reaction force offset control according to the deviation margin time and the reaction force offset control according to the lateral position, the lane departure can be effectively suppressed while applying a stable reaction force according to the distance to the white line. In this event, an optimum steering reaction force that is always required can be applied by using the reaction force having a larger absolute value between the reaction force corresponding to the deviation margin time and the reaction force corresponding to the lateral position.

As described above, Example 1 achieves the following effects.

(1) The steering control device includes: the steering unit 1 mechanically uncoupled from the turning unit 2 configured to turn the left and right front wheels 5L and 5R, and configured to receive steering input from the driver; the turning control unit 19 configured to control the turning amount of the turning unit 2 based on the steering amount of the steering unit 1; the steering reaction force control unit 20 configured to apply the steering reaction force corresponding to the self-aligning torque to the steering unit 1 based on the steering reaction force characteristic corresponding to the self-aligning torque such that the larger the self-aligning torque, the larger the steering reaction force; the curvature calculation part 34*a* configured to detect the curvature of the white line; and the lateral force offset section 34 configured to increase the change amount of the steering reaction force relative to the change amount of the self-aligning torque in the steering reaction force characteristic as the detected curvature is increased. Therefore, since the larger the curvature, the smaller the change in the steering angle relative to the change in the maintained steering torque, the sensitivity of the vehicle to the steering torque is kept low. Thus, the course correction by the driver during turning can be facilitated.

(2) The steering reaction force control unit 20 reduces the steering reaction force corresponding to the self-aligning torque as the curvature is increased. Therefore, since the larger the curvature, the smaller the maintained steering torque, the steering load on the driver can be reduced.

(3) The steering reaction force characteristic is that the change amount of the steering reaction force relative to the change amount of the self-aligning torque is larger in a case where the self-aligning torque is small than that in a case where the self-aligning torque is large. Thus, the steering reaction force characteristic is more offset in the same direction as the self-aligning torque as the curvature is larger, so that, as the curvature is increased, the change amount of the steering reaction force relative to the change amount of the self-aligning torque can be increased, and the maintained steering torque can be reduced.

(4) The steering control device includes: the steering unit 1 mechanically uncoupled from the turning unit 2 configured to turn the left and right front wheels 5FL and 5FR, and configured to receive steering input from the driver; the turning control unit 19 configured to control the turning amount of the turning unit 2 based on the steering amount of the steering unit 1; a steering reaction force control unit 20 configured to set a steering reaction force characteristic, on coordinates with a self-aligning torque and a steering reaction force as coordinate axes, such that the larger the self-aligning torque, the larger the steering reaction force, and the change amount of the steering reaction force relative to the change amount of the self-aligning torque is larger in a case where the self-aligning torque is small than that in a case where the self-aligning torque is large, and to apply the steering reaction force corresponding to the self-aligning torque to the steering unit 1 based on the steering reaction force characteristic; the curvature calculation part 34*a* configured to detect the curvature of the white line; and the lateral force offset section 34 configured to offset the steering reaction force characteristic on the coordinates in the same sign direction as the self-aligning torque as the detected curvature is increased. Therefore, since the larger the curvature, the smaller the change in the steering angle relative to the change in the maintained steering torque, the sensitivity of the vehicle to the steering torque is kept low. Thus, the course correction by the driver during turning can be facilitated. Moreover, since the maintained steering torque to maintain the steering angle can be reduced, the steering load on the driver during turning can be reduced.

(5) The steering reaction force characteristic is that the sign of the steering reaction force is inverted over a position where the self-aligning torque is zero. Therefore, since the larger the curvature, the smaller the change in the steering angle relative to the change in the maintained steering torque, the sensitivity of the vehicle to the steering torque is kept low. Thus, the course correction by the driver during turning can be facilitated. Moreover, since the maintained steering torque to maintain the steering angle can be reduced, the steering load on the driver during turning can be reduced.

(6) The steering control device configured to control the turning amount of the turning unit 2 based on the steering amount of the steering unit 1 mechanically uncoupled from the turning unit 2, and to increase the change amount of the steering reaction force relative to the change amount of the self-aligning torque in the steering reaction force characteristic as the curvature of the white line is increased when applying the steering reaction force corresponding to the self-aligning torque to the steering unit 1 based on the steering reaction force characteristic corresponding to the self-aligning torque such that the larger the self-aligning torque, the larger the steering reaction force. Therefore, since the larger the curvature, the smaller the change in the steering angle relative to the change in the maintained steering torque, the sensitivity of the vehicle to the steering torque is kept low. Thus, the course correction by the driver during turning can be facilitated.

(7) The steering control device includes: the curvature calculation part 34*a* configured to detect the curvature of the white line; and the steering reaction force control unit 20 configured to control the turning amount of the turning unit 2 based on the steering amount of the steering unit 1 mechanically uncoupled from the turning unit 2, and to increase the change amount of the steering reaction force relative to the change amount of the self-aligning torque in the steering reaction force characteristic as the curvature is increased when applying the steering reaction force corresponding to the self-aligning torque to the steering unit 1 based on the steering reaction force characteristic corresponding to the self-aligning torque such that the larger the self-aligning torque, the larger the steering reaction force. Therefore, since the larger the curvature, the smaller the change in the steering angle relative to the change in the maintained steering torque, the sensitivity of the vehicle to the steering torque is kept low. Thus, the course correction by the driver during turning can be facilitated.

The invention claimed is:
1. A steering control device comprising:
a steering unit mechanically uncoupled from a turning unit configured to turn a turning wheel, and configured to receive steering input from a driver;
a turning control unit configured to control a turning amount of the turning unit based on a steering amount of the steering unit;
a steering reaction force control unit configured to apply a steering reaction force corresponding to a self-aligning torque to the steering unit based on a steering reaction force characteristic corresponding to the self-aligning torque such that the larger the self-aligning torque, the larger the steering reaction force;

a curvature detection unit configured to detect a curvature of a white line; and a steering reaction force characteristic change unit configured to increase a change amount of the steering reaction force relative to a change amount of the self-aligning torque in the steering reaction force characteristic as the detected curvature is increased.

2. The steering control device according to claim 1, wherein the steering reaction force control unit reduces the steering reaction force relative to the self-aligning torque as the curvature is increased.

3. The steering control device according to claim 1, wherein the steering reaction force characteristic is that the change amount of the steering reaction force relative to the change amount of the self-aligning torque is larger in a case where the self-aligning torque is small than that in a case where the self-aligning torque is large.

4. A steering control device comprising:
a steering unit mechanically uncoupled from a turning unit configured to turn a turning wheel, and configured to receive steering input from a driver;
a turning control unit configured to control a turning amount of the turning unit based on a steering amount of the steering unit;
a steering reaction force control unit configured to set a steering reaction force characteristic, on coordinates with a self-aligning torque and a steering reaction force as coordinate axes, such that the larger the self-aligning torque, the larger the steering reaction force, and the change amount of the steering reaction force relative to the change amount of the self-aligning torque is larger in a case where the self-aligning torque is small than that in a case where the self-aligning torque is large, and to apply the steering reaction force corresponding to the self-aligning torque to the steering unit based on the steering reaction force characteristic;
a curvature detection unit configured to detect a curvature of a white line; and
an offset unit configured to more offset the steering reaction force characteristic on the coordinates in the same sign direction as the self-aligning torque as the detected curvature is increased.

5. The steering control device according to claim 4, wherein the steering reaction force characteristic is that the sign of the steering reaction force is inverted over a position where the self-aligning torque is zero.

6. A steering control device configured to control a turning amount of a turning unit based on a steering amount of a steering unit mechanically uncoupled from the turning unit, and to increase a change amount of a steering reaction force relative to a change amount of a self-aligning torque in a steering reaction force characteristic as a curvature of a white line is increased, when applying the steering reaction force corresponding to the self-aligning torque to the steering unit based on the steering reaction force characteristic corresponding to the self-aligning torque such that the larger the self-aligning torque, the larger the steering reaction force.

7. A steering control device comprising:
a sensor configured to detect a curvature of a white line; and
a controller configured to control a turning amount of a turning unit based on a steering amount of a steering unit mechanically uncoupled from the turning unit, and to increase a change amount of a steering reaction force relative to a change amount of a self-aligning torque in a steering reaction force characteristic as the curvature of the white line is increased when applying a steering reaction force corresponding to the self-aligning torque to the steering unit based on a steering reaction force characteristic corresponding to the self-aligning torque such that the larger the self-aligning torque, the larger the steering reaction force.

* * * * *